Sept. 27, 1960 L. A. STENGEL 2,954,013
PROCESS AND APPARATUS FOR VAPORIZATION OF NITRIC ACID
Filed June 21, 1957
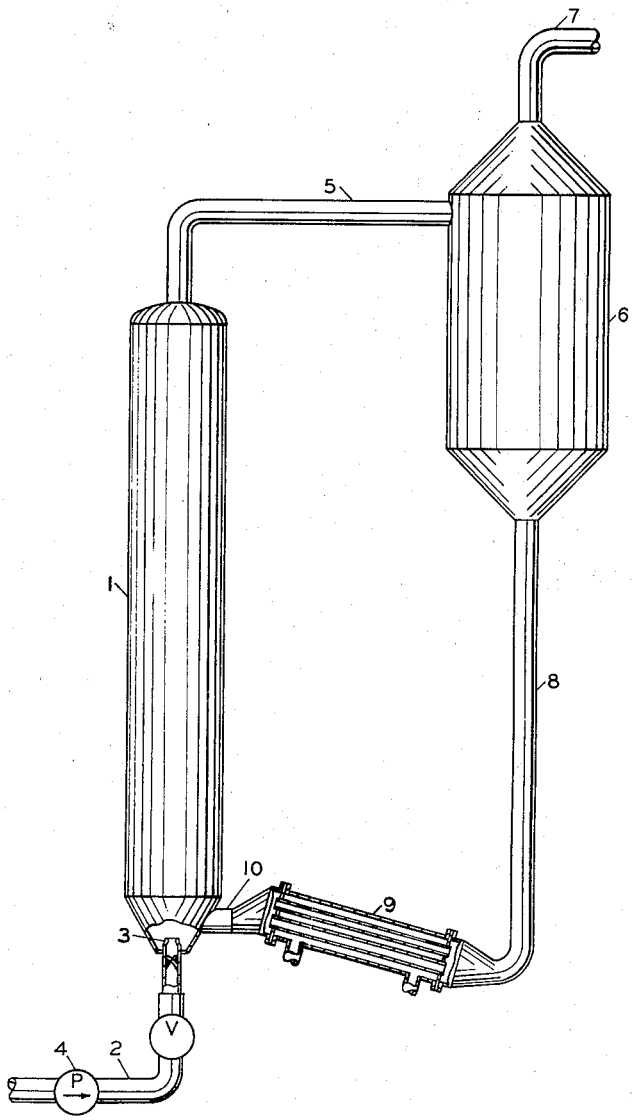
INVENTOR
*Leonard A. Stengel*
BY *Francis M. Crawford*
ATTORNEY

United States Patent Office 2,954,013
Patented Sept. 27, 1960

2,954,013

PROCESS AND APPARATUS FOR VAPORIZATION OF NITRIC ACID

Leonard A. Stengel, Terre Haute, Ind., assignor to Commercial Solvents Corporation, Terre Haute, Ind., a corporation of Maryland Filed June 21, 1957, Ser. No. 667,235

4 Claims. (Cl. 122—31)

My invention relates to the vaporization of nitric acid and more particularly it relates to a process for vaporization of nitric acid by contact with molten salt and to an apparatus in which the process can be carried out.

Nitric acid vapors find a number of uses in the chemical industry as, for example, in the production of ammonium nitrate, the vapor phase nitration of lower alkanes to produce nitroparaffins, etc. Heretofore, nitric acid has generally been vaporized by direct heating which requires raising the temperature of liquid nitric acid until the vapors are produced. When such a procedure is used, large volumes of liquid nitric acid must be held at steadily increasing temperatures and under such conditions, nitric acid is extremely corrosive requiring the use of expensive corrosion resistant equipment.

I have now discovered a process for vaporizing nitric acid wherein the nitric acid is almost instantaneously vaporized on a continuous basis so that no large volumes of nitric acid need be held at steadily increasing temperatures. My new process makes possible a steady dependable supply of vaporous nitric acid under conditions in which corrosion is greatly minimized. My new process is economical, convenient, and utilizes an apparatus which is inexpensive and readily fabricated.

According to my new process, I continuously introduce liquid nitric acid into a circulating molten salt system whereby the liquid nitric acid is instantaneously vaporized, the nitric acid vapors being then separated from the molten salt in a vapor separator, and the molten salt reheated to the desired original temperature.

In carrying out my new process, I preferably introduce liquid nitric acid through a spray or jet nozzle under pressure into the molten salt system. Pressures ranging from about 10 to about 200 p.s.i. can be employed. The molten salt which I employ can be any salt or mixture of salts having a relatively high melting point and which is inert to nitric acid and its decomposition products and to the walls of the reactor. The molten salt used should also not decompose under the conditions of its use to form decomposition products which react with the walls of the reactor, or with the nitric acid being vaporized, or with the decomposition products thereof. Preferably I employ a eutectic mixture of sodium and potassium nitrates, such mixture being inert and having a melting point of about 250° C. I can also employ a eutectic mixture of sodium, potassium and lithium nitrates having a melting point of about 170° C. Generally, I prefer to employ temperatures of at least about 300° C. in order to insure essentially instantaneous vaporization of nitric acid. I can employ temperatures up to about 550° C., above which the molten salt mixtures are generally subject to decomposition.

Following introduction of the liquid nitric acid into the molten salt mixture, I conduct the mixture of molten salt and nitric acid vapors to a separator wherein the nitric acid vapors are removed from the molten salt which is then recirculated through a heat exchanger to maintain the temperature at the desired level.

The nitric acid which I employ can be of any strength from highly diluted aqueous solutions to highly concentrated solutions so long as the temperature of the molten salt is maintained high enough to vaporize the nitric acid instantly. Instantaneous vaporization is desired since nitric acid vapors are essentially non-corrosive as compared to liquid nitric acid which is highly corrosive and consequently I can carry out my process in apparatus constructed of ordinary stainless steel. It is, of course, preferable to employ a corrosion resistant nozzle for injecting the liquid nitric acid into the molten salt.

In carrying out my new process, I prefer to employ an apparatus of the type shown in the accompanying figure which is a schematic view of an apparatus which is also part of my invention. Referring to the drawing, the apparatus consists of a vertical tube 1 which can be of stainless steel having an inlet line 2 terminating in a nozzle 3, a pump 4 being connected in the inlet line for introduction of the liquid nitric acid. The vertical tube 1 is connected by means of the smaller tube 5 to a separator or disengaging section 6 from which there is a vapor exit 7 and a liquid exit 8 which liquid exit is connected to a heat exchanger 9. The heat exchanger can be of any type in which temperatures as high as about 550° C. can be obtained. Preferably I employ a gas-fired heater, the liquid passing through tubes in the heated zone. The heat exchanger is then connected to the tube 1 by means of the line 10.

For efficient operation of the apparatus of my invention, it is necessary to insulate the apparatus as well as is practicable. It is also advisable to maintain a heating jacket around the vapor line 7 as any nitric acid which cools to the dew point becomes quite corrosive to the vapor line.

In carrying out my new process in the apparatus described, I pump liquid nitric acid through the pump 4, the line 2 and the nozzle 3 into a molten salt mixture in the vertical tube 1. The mixture of nitric acid vapors and molten salt is carried upwards through the tube 5 into the separator 6 which, being of a relatively large volume compared to the line 5, permits the separation of the nitric acid vapors from the molten salt and separation of the nitric acid vapors through the line 7. The molten salt mixture then flows down through the line 8 through the heat exchanger 9 and the line 10 back to the vertical tube 1.

Generally, the circulatory flow of the molten salt is automatic where there is as much as 80% by volume of the molten salt in the apparatus. However in some instances it is necessary to install a pump in the system to insure an adequate circulation of the molten salt.

Now having described my invention, what I claim is:

1. A process for the vaporization of nitric acid which comprises introducing liquid nitric acid under a pressure ranging from about 10 to about 200 p.s.i. into a circulating molten heat transfer medium inert to nitric acid and its decomposition products maintained at a temperature ranging from about 300 to about 550° C., and separating nitric acid vapors from the molten heat transfer medium and reheating the molten heat transfer medium.

2. An apparatus for vaporization of nitric acid which comprises an elongated vertical tubular vaporization chamber having a liquid nitric acid inlet at the bottom, an exit tube at the top, a vapor-liquid separator having a vapor exit, an inlet connected to said exit tube and a liquid return to the lower end of the said vaporization chamber, means for heating liquid in the said liquid return said vaporization chamber and said exit tube therefrom being filled with molten heat exchanged medium inert to nitric acid and decomposition products thereof.

3. A process for the continuous production of nitric acid vapors which comprises continuously introducing liquid nitric acid under pressures of about 10 to about 200 p.s.i.g. into a continuously circulating liquid heat transfer medium maintained at about 300–500° C. in a vaporization chamber, said heat transfer media being selected from the group consisting of salts and mixtures thereof, inert to nitric acid and its decomposition products and to the walls of the reactor with which they come in contact, melting above about 170° C. and decomposing at temperatures in excess of 550° C.; passing the liquid heat transfer medium containing the resulting nitric acid vapors into an enlarged separator wherein nitric acid vapors entrained in the heat transfer medium escape from said heat transfer medium; removing the nitric acid vapors; continuously heating to desired temperatures the heat transfer medium from which the nitric acid vapors have been removed, and continuously passing the heated heat transfer medium into the vaporization chamber.

4. A process for the continuous production of nitric acid vapors which comprises continuously introducing liquid nitric acid under pressures of about 10 to about 200 p.s.i.g. into a continuously circulating liquid heat transfer medium maintained at about 300–550° C. in a vaporization chamber, said heat transfer medium being selected from the group consisting of a eutectic mixture of sodium and potassium nitrates and a eutectic mixture of sodium, potassium and lithium nitrates, passing the liquid heat transfer medium containing the resulting nitric acid vapors into an enlarged separator wherein nitric acid vapors entrained in the heat transfer medium escape from said heat transfer medium, removing the nitric acid vapors, continuously heating to desired temperatures the heat transfer medium from which the nitric acid vapors have been removed, and continuously passing the heated heat transfer medium to the vaporization chamber.

References Cited in the file of this patent

UNITED STATES PATENTS

| | | |
|---|---|---|
| 660,755 | Kreusler | Oct. 30, 1900 |
| 1,682,265 | Bringhenti | Aug. 28, 1928 |
| 1,707,369 | Primrose | Apr. 2, 1929 |
| 1,807,783 | Gay | June 2, 1931 |
| 1,905,185 | Morris | Apr. 25, 1933 |
| 1,997,980 | Smith | Apr. 16, 1935 |
| 2,222,575 | Schutte | Nov. 19, 1940 |
| 2,800,177 | Miller | July 23, 1957 |

UNITED STATES PATENT OFFICE

CERTIFICATE OF CORRECTION

Patent No. 2,954,013                      September 27, 1960

Leonard A. Stengel

It is hereby certified that error appears in the printed specification of the above numbered patent requiring correction and that the said Letters Patent should read as corrected below.

Column 3, line 3, for "300-500" read -- 300-550 --.

Signed and sealed this 11th day of April 1961.

(SEAL)
Attest:

ERNEST W. SWIDER
Attesting Officer

ARTHUR W. CROCKER
Acting Commissioner of Patents